US006557035B1

(12) United States Patent
McKnight (10) Patent No.: US 6,557,035 B1
(45) Date of Patent: Apr. 29, 2003

(54) RULES-BASED METHOD OF AND SYSTEM FOR OPTIMIZING SERVER HARDWARE CAPACITY AND PERFORMANCE

(75) Inventor: Gregory Joseph McKnight, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,383

(22) Filed: Mar. 30, 1999

(51) Int. Cl.[7] ............................................ G06F 15/173
(52) U.S. Cl. ........................ 709/224; 709/202; 709/203; 709/223; 709/105
(58) Field of Search ................................. 709/202–203, 709/217–219, 223–224, 231–235, 105; 710/52, 56–57, 60

(56) References Cited

U.S. PATENT DOCUMENTS

| | | | | |
|---|---|---|---|---|
| 5,548,724 A | * | 8/1996 | Akizawa et al. | ............ 709/203 |
| 5,649,200 A | | 7/1997 | Leblang et al. | ............. 717/122 |
| 5,751,914 A | | 5/1998 | Coley et al. | ................... 706/47 |
| 5,761,380 A | | 6/1998 | Lewis et al. | ................ 717/177 |
| 5,771,356 A | * | 6/1998 | Leger et al. | ................ 709/233 |
| 5,774,661 A | | 6/1998 | Chatterjee et al. | .......... 709/203 |
| 5,781,703 A | | 7/1998 | Desai et al. | ................ 709/224 |
| 5,802,509 A | | 9/1998 | Maeda et al. | ................ 706/59 |
| 5,809,238 A | | 9/1998 | Greenblatt et al. | .......... 709/202 |
| 5,815,638 A | | 9/1998 | Lenz et al. | ..................... 706/15 |
| 5,951,634 A | * | 9/1999 | Sitbon et al. | ................ 709/105 |
| 6,021,437 A | * | 2/2000 | Chen et al. | .................. 709/224 |
| 6,061,722 A | * | 5/2000 | Lipa et al. | ................... 709/224 |
| 6,128,642 A | * | 10/2000 | Doraswamy et al. | ........ 709/201 |

OTHER PUBLICATIONS

IBM Technical Disclosure Bulletin, *Method for Atomic Peer–to–Peer Communication on a Peripheral Component Interconnect Bus*, vol. 39, No. 01, Jan. 1996.

* cited by examiner

Primary Examiner—Bharat Barot
(74) Attorney, Agent, or Firm—Bracewell&Patterson LLP (57) ABSTRACT

A method of optimizing server hardware performance and predicting server hardware bottlenecks monitors server hardware utilization parameters over a selected time period and computes the averages of the measurements. The method then compares the computed averages to thresholds. If some of the computed averages are equal to or greater than the threshold, the method reports a performance bottleneck and provides a recommended solution for the bottleneck. The method predicts a future server hardware performance bottleneck by computing running averages of the measured server utilization parameters. The method uses a linear regression analysis to determine a trend in the running averages and compares the trend to threshold values to predict the occurrence of a performance bottleneck.

23 Claims, 5 Drawing Sheets

RULES-BASED METHOD OF AND SYSTEM FOR OPTIMIZING SERVER HARDWARE CAPACITY AND PERFORMANCE

FIELD OF THE INVENTION

The present invention relates generally to the field of computer hardware performance monitoring and optimization, and more particularly to an automated rules-based system and method for detecting and predicting server hardware bottlenecks and recommending hardware upgrades to solve bottlenecks.

DESCRIPTION OF THE PRIOR ART

In the early days of computing, computer systems were standalone processors to which peripheral devices such as displays, printers, and input devices were coupled. Each computer system was independent and ran its own independent application programs. There was very little communication between computer systems.

Today it is well known to interconnect computer systems in complex computer networks, to share data, services and resources associated with the numerous computer systems that have access to the distributed computing environment. Networks range from small local area networks (LANs), to large wide area networks (WANs), to vast interconnected networks such as intranets and the Internet itself. In today's computing environment, the work of computing is distributed between various machines in a client/server architecture. Clients provide a user interface and perform a portion of the work of the system. Servers respond to requests from clients for data, files, and actual computing services.

Servers are implemented in systems that include various hardware resources, including central processing units (CPUs), memory, disk drives, and communications interfaces or adapters. Server hardware resources are relatively expensive and configuring the correct amount of CPU power, memory, disk drives, and communications throughput on a network system is a complex task. Typically, the task of configuring the proper power and amount of server hardware resources is done on a hit or miss strategy. As the number of users increases or the workload of the server changes over time, bottlenecks are created within the server hardware resources resulting in slow performance. Since server systems are complex and their hardware resources are interrelated, it is not easy to determine the actual source or cause of a bottleneck.

Most modern operating systems provide server hardware resource utilization measurements. However, the system administrator must be skilled in interpreting this resource utilization information to identify system hardware bottlenecks. This is a complex task and often prone to error because utilization information is dynamic and longer term trends are more important for accurately diagnosing system hardware bottlenecks than short term peaks and fluctuations.

System bottlenecks can be caused by improper software design, improper software configuration, or excessive usage by one or more users. These problems usually create one or more hardware bottlenecks. Diagnosing the cause of a particular bottleneck is complex and often beyond the capabilities of the average system administrator. Often software redesign is painful and time consuming. Occasionally bottlenecks can be alleviated by simple software configuration changes. However, in most cases, a hardware upgrade is the least difficult and least costly modification to alleviate system bottlenecks.

SUMMARY OF THE INVENTION

The present invention provides a method of optimizing server hardware performance and predicting server hardware bottlenecks. The method monitors a server hardware utilization parameter and computes the average of the measurements of the utilization parameter over a selected time period. The method then compares the computed average to a threshold value for the measured utilization parameter. If the computed average is equal to or greater than the threshold, the method reports a performance bottleneck and provides a recommended solution for the bottleneck.

Preferably, the method of the present invention monitors a plurality of hardware utilization parameters, including, but not limited to, CPU utilization, memory utilization, disk queue depth or disk utilization, LAN byte throughput and LAN packet throughput. The method is preferably implemented with a rules base. The method applies a set of rules to utilization parameter averages to detect and report performance bottlenecks and make recommendations.

The method predicts a server hardware performance bottleneck by computing running averages of the measured server utilization parameter over selected time periods. The method uses a linear regression analysis to determine a trend in the running averages and compares the trend to a threshold value for the server utilization parameter to predict the occurrence of a performance bottleneck.

DESCRIPTION OF THE PREFERRED EMBODIMENT

Figure 1:
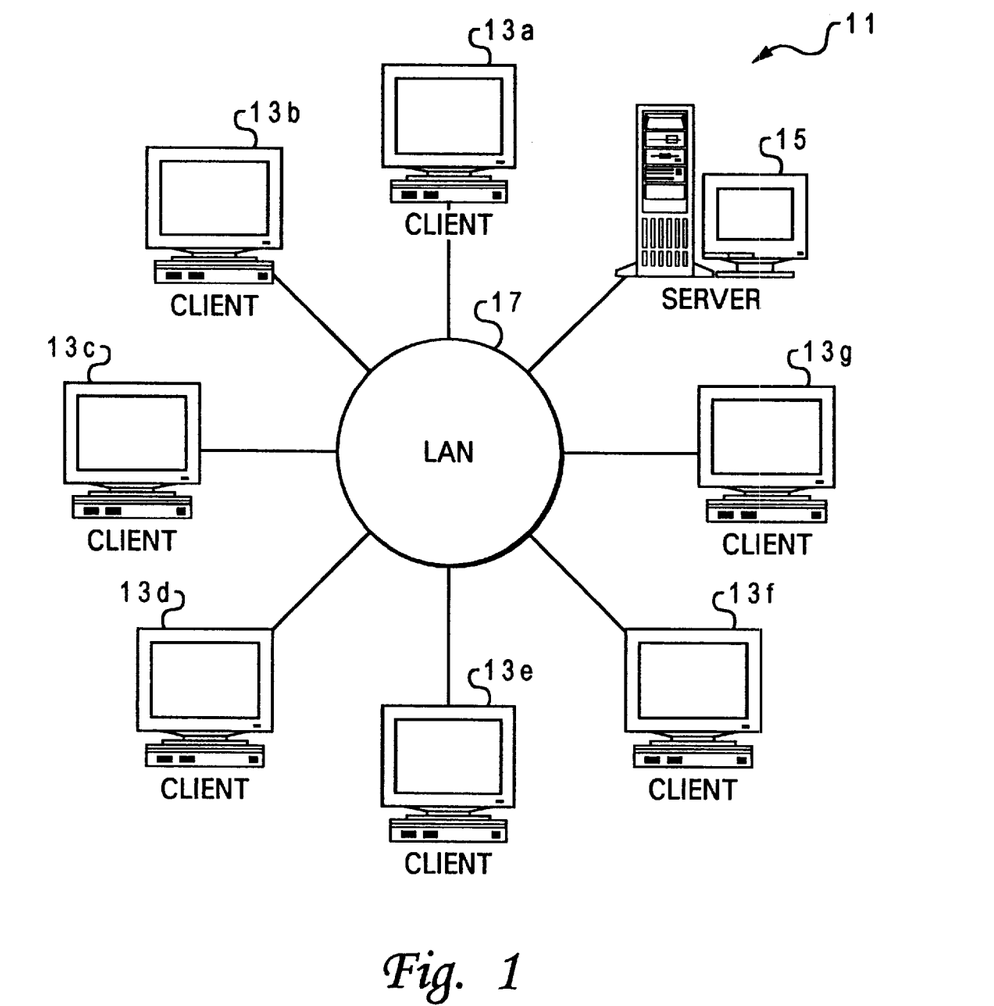
FIG. 1 is a block diagram of a network according to the present invention.

Referring now to the drawings, and first to FIG. 1, a network is designated generally by the numeral 11. Network 11 includes a plurality of client machines 13 and a server machine 15. Machines 13 and 15 are connected to a local area network (LAN) 17. Network 11 is depicted in a ring topology; however, as will be apparent to those skilled in the art, the method and system of the present invention are applicable to other network topologies and configurations. Additionally, the method and system of the present invention are applicable to wide area networks (WANs), intranets, and the Internet, as well as local area networks as shown in FIG. 1.

Figure 2:
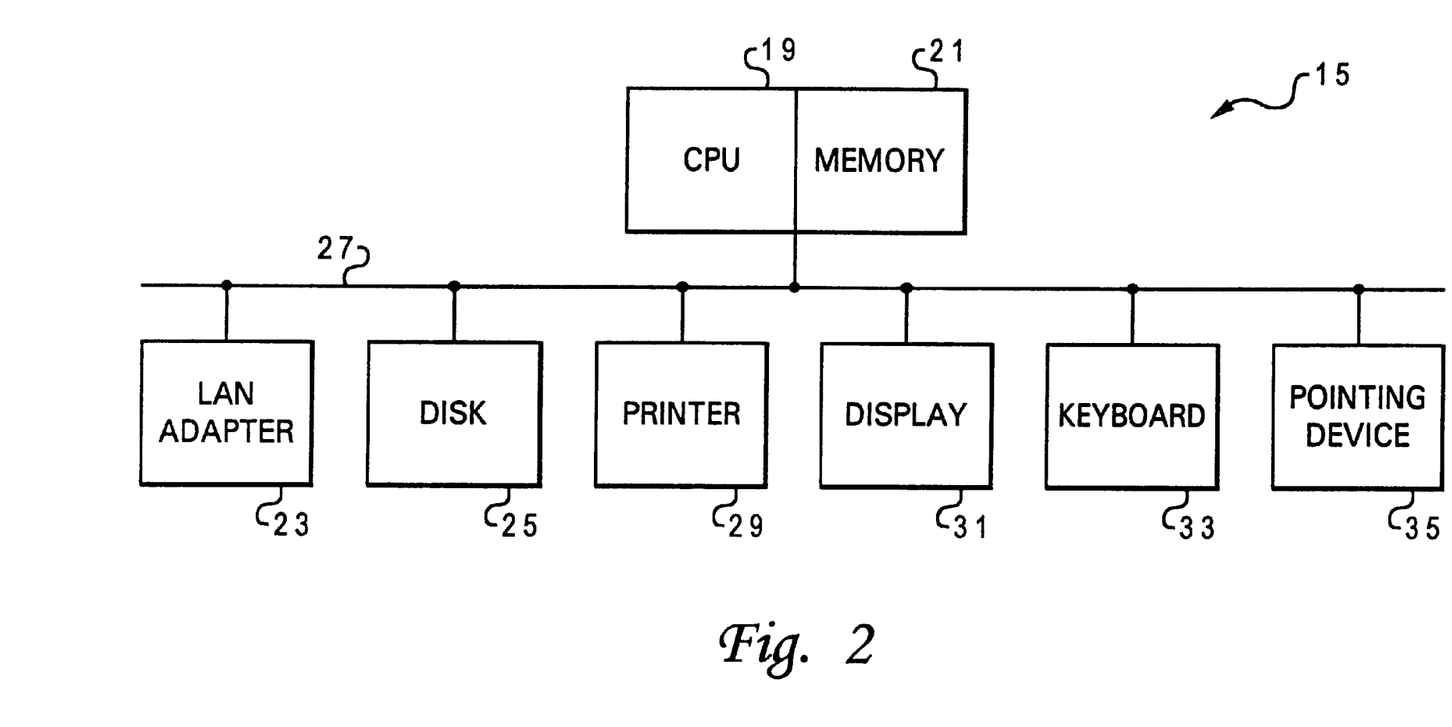
FIG. 2 is block diagram of a server according to the present invention.

Referring now to FIG. 2, there is shown a block diagram of some of the hardware resources of server 15. Server 15 includes a central processing unit (CPU) 19. As in apparent to those skilled in the art, server 15 may include multiple CPUs. Server 15 also includes memory 21. CPU 19 accesses memory 21 to perform computing tasks, in the manner well known to those skilled in the art.

In addition to CPU 19 and memory 21, server 15 includes peripheral devices or resources necessary to perform its server functions. The resources include a LAN adaptor 23 and a disk device 25. LAN adaptor 23 and disk device 25 are connected to CPU 19 and memory 21 by an IO bus 27. In an actual system, server 15 may include multiple LAN adapters 23 and multiple disks 25. Server 15 also includes peripheral devices such as a printer 29, a display 31, a keyboard 33, and a pointing device 35, all connected with CPU 19 and memory 21 by IO bus 27. Devices 29–35 provide a user interface to server 15 to allow it to perform its functions as a computer. However, the resources germane to the method and system of the present invention are CPU 19, memory 21, LAN adaptor 23, and disk 25, which are the key hardware components of the server function of server 15.

According to the present invention, the respective utilizations of the resources including CPU 19, memory 21, LAN adaptor 23, and disk 25, are monitored. On a server implemented on the Microsoft Windows NT™ platform, resource utilization is monitored with the NT Performance Monitor™ (PerfMon™) tool. The PerfMon tool monitors CPU utilization, memory utilization, either logical disk queue depth or disk utilization, LAN bytes per second (LAN byte throughput) and LAN packets per second (LAN packet throughput). The present invention provides an automated rules-based methodology for server hardware resource performance and capacity optimization that recognizes server hardware bottlenecks and generates recommendations explaining how to circumvent or remedy the identified bottlenecks with hardware component upgrades.

Figure 3:
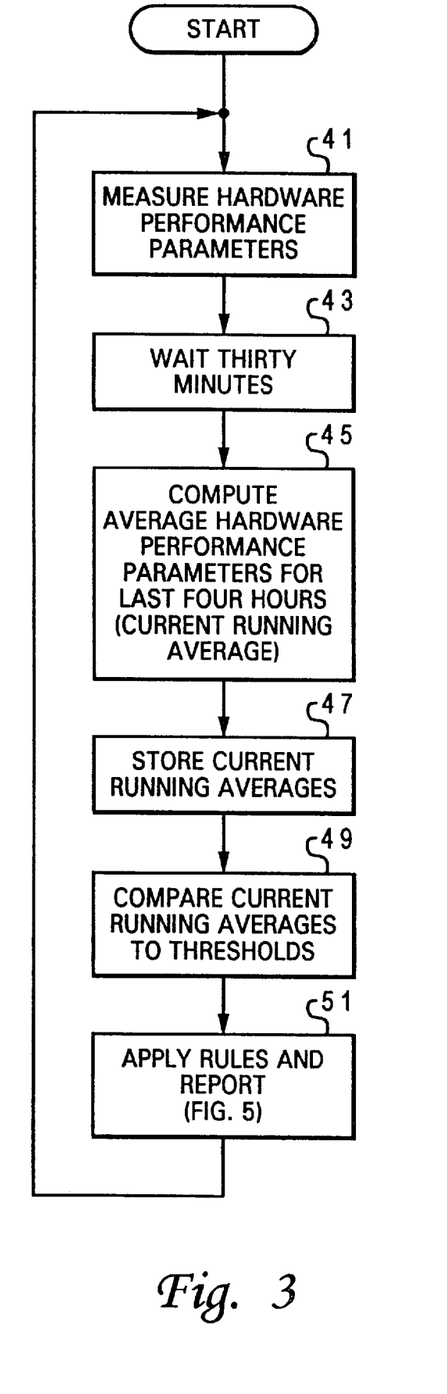
FIG. 3 is a high level flow chart of bottleneck detection processing according to the present invention.

Referring to FIG. 3, the method and system of the present invention measures the hardware performance parameters substantially continuously, at block 41. Periodically, for example, every thirty minutes as indicated in block 43, the present invention computes the averages of the hardware performance parameters measured over a selected period of time, for example, for the last four hours, at block 45. The present invention thus periodically computes running averages for the measured performance parameters. The method of the present invention then stores the current running average at block 47, and compares the current running average to predetermined threshold values, at block 49. Preferably, the predetermined threshold values default to 75% utilization and a disk queue depth of four outstanding IO operations per physical disk device. However, according to the present invention, a user or system administrator is allowed to override these defaults for special situations. As indicated generally at block 51 and shown in detail with respect to FIG. 5, the method of the present invention applies a set of rules to the current running averages and thresholds and reports results to the user or system administrator. Then, processing returns to block 41. Thus, as shown in FIG. 3, the method and system of the present invention continually monitors hardware resource performance parameters and periodically analyzes the monitored performances.

Figure 5:
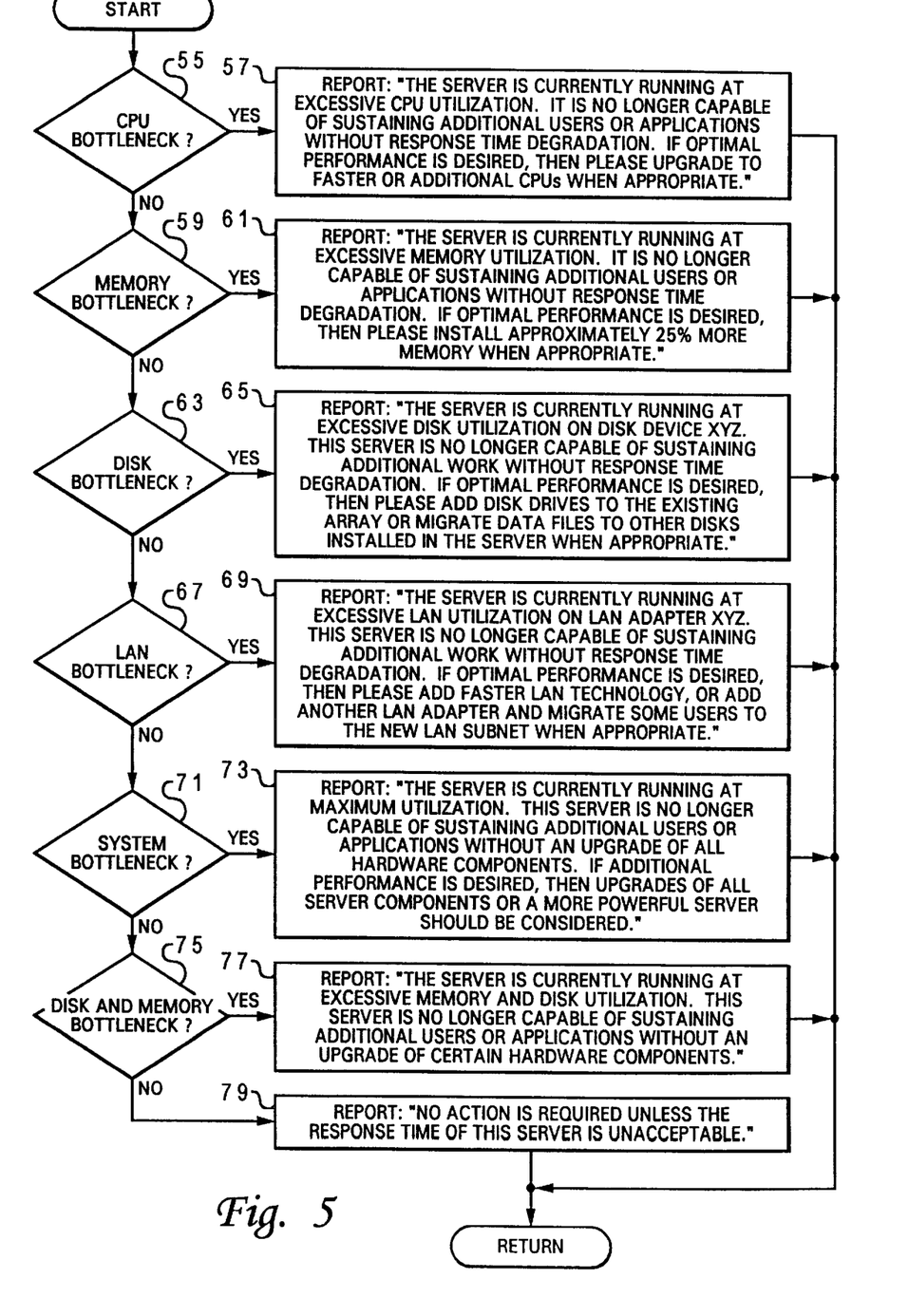
FIG. 5 is a high level flow chart of rules processing according to the present invention.

Referring now to FIG. 5, there is shown a flowchart of the analysis and reporting function indicated generally at block 51 of FIG. 3. The method of the present invention determines, as indicated generally at decision block 55, if the current running average hardware resource performance parameters indicate the presence of the CPU bottleneck. According to the present invention, a CPU bottleneck occurs when the current running average CPU utilization is equal to or greater than the CPU utilization threshold and each of the current running average memory utilization, running average disk queue depth, running average LAN byte throughput, and running average LAN packet throughput values is less than its respective threshold value. If the system detects a CPU bottleneck, then the system reports, as indicated at block 57, "The server is currently running at excessive CPU utilization. It is no longer capable of sustaining additional users or applications without response time degradation." The system also makes a recommendation by reporting "If optimal performance is desired, then please upgrade to faster or additional CPUs when appropriate." Thus, in the case of a CPU bottleneck, the system reports the bottleneck and makes a recommendation for removing the bottleneck. The report may be displayed on a display associated with the server or it may be printed.

If the system does not detect a CPU bottleneck, at decision block 55, the system determines, at decision block 59, if there is a memory bottleneck. According to the present invention, a memory bottleneck is detected when the running average memory utilization is equal or greater than the memory utilization threshold, and each of the running average CPU utilization, running average disk queue depth, running average LAN byte throughput, and running average LAN packet throughput, results is less than its respective threshold. If the system detects a memory bottleneck, then the system reports, as indicated at block 61, "The server is currently running at excessive memory utilization. It is no longer capable of sustaining additional users or applications without response time degradation." Then the system recommends a course of action by reporting "If optimal performance is desired, then please install approximately 25% more memory when appropriate."

If, at decision block 59, the system does not detect a memory bottleneck, then the system determines, at decision block 63, if there is a disk bottleneck. According to the present invention, a disk bottleneck occurs when either the running average for disk utilization is greater than a disk utilization threshold or the running average disk queue depth is equal to or greater than the disk queue depth threshold and each of the other running averages is less than its respective threshold. If the system determines that there is a disk bottleneck, then the system reports, at block 65, "The server is currently running at excessive disk utilization on disk device XYZ (the identity of the overutilized disk). This server is no longer capable of sustaining additional work without response time degradation." The system then recommends a solution by reporting "If optimal performance is desired, then please add disk drives to the existing array or migrate data files to other disks installed when appropriate." When other drives are installed in the server, the system of the present invention may do analysis to see which drive has the lowest running average utilization or disk queue depth and recommend that some of the work load be migrated to the drive or drives with the lowest utilization or queue depth.

If, at decision block 63, the system does not detect a disk bottleneck, then the system determines, as indicated generally at decision block 67, if there is a LAN or communications bottleneck. A LAN bottleneck occurs when either the byte or packet throughput threshold is reached. Thus, a LAN bottleneck is detected when the running average LAN byte throughput is equal to or greater than the LAN byte throughput threshold or the running average LAN packet throughput is equal to or greater than the LAN packet throughput threshold, and each of the other running average utilizations is less than its respective threshold. If the system detects a LAN bottleneck, then the system reports, as indicated at block 69, "The server is currently running at excessive LAN utilization on LAN adaptor XYZ (the identity of the overutilized adaptor). This server is no longer capable of sustaining additional work without response time degradation." The system then recommends a solution by reporting "If optimal performance is desired, then please add faster LAN technology, or add another LAN adaptor and migrate some users to a new LAN subnet when appropriate." The system may do other analysis to determine which LAN adapters are running at the lowest average LAN byte throughput or running average LAN packet throughput and recommend that some of the workload be migrated to the LAN or LANs with the lowest utilization.

If, at decision block 67, the system does not detect a LAN bottleneck, the system determines, at decision block 71, if there is a system bottleneck. The system bottleneck occurs when every hardware resources are reutilized. Thus, in a system bottleneck, the running average of each hardware resource utilization exceeds its respective threshold. In the case of a system bottleneck, the system reports, as shown at block 73, "The server is currently running at maximum utilization. This server is no longer capable of sustaining additional users or applications without an upgrade of all hardware components." The system then recommends a solution by reporting "If additional performance in required, then upgrades of all server components or a more powerful server should be considered."

In addition to bottlenecks caused by the overutilization of a single resource, such as a CPU bottleneck, a memory bottleneck, a disk bottleneck, or a LAN bottleneck, or a complete system bottleneck in which all resources are overutilized, a combination of two or three hardware resources may be overutilized. Thus, for example, the system may determine at decision block 75, if there is a disk and memory bottleneck, which occurs when both the running average memory utilization and running average disk queue depth are greater than their respective thresholds and each of the other running averages is equal to or less than its respective threshold. In the case of a disk and memory bottleneck, the system reports, as indicated at block 77, "The server is currently running at excessive memory and disk utilization. This server is no longer capable of sustaining additional users or applications without an upgrade of certain hardware components." The system may recommend improvement by reporting "This condition indicates excessive disk swapping may be occurring. To correct this situation, first install 25% more memory. The system will continue to monitor the server and recommend additional configuration modifications, if necessary." Generally, if the system of the present invention observes any two or three subsystems that exceed their respective thresholds, the system reports "The server is currently running at maximum utilization. It is no longer capable of sustaining additional users or applications without upgrading the following hardware components: (state which ones). If additional performance is desired, then please consider upgrading all of the identified components."

If the system of the present invention detects no bottlenecks, then the system reports, at block 79, "No action is required unless the response time of this server is unacceptable."

Figure 4:
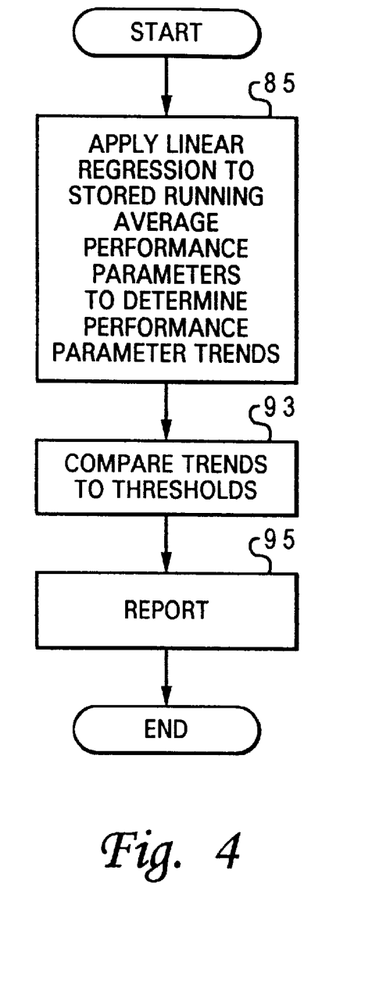
FIG. 4 is a high level flow chart of bottleneck prediction processing according to the present invention.

In addition to real-time hardware resource performance bottleneck detection and solution recommendation, the present invention provides for the prediction of future hardware resource bottlenecks. Referring to FIG. 4, periodically, (for example, daily, weekly, or monthly) the present invention applies linear regression to stored running average performance parameters to determine performance parameter trends, at block 85. For example, the present invention applies the method of least squares to fit a line to the stored running averages. The linear regression analysis produces an equation in slope intercept form (y=mx+b).

Figure 6:
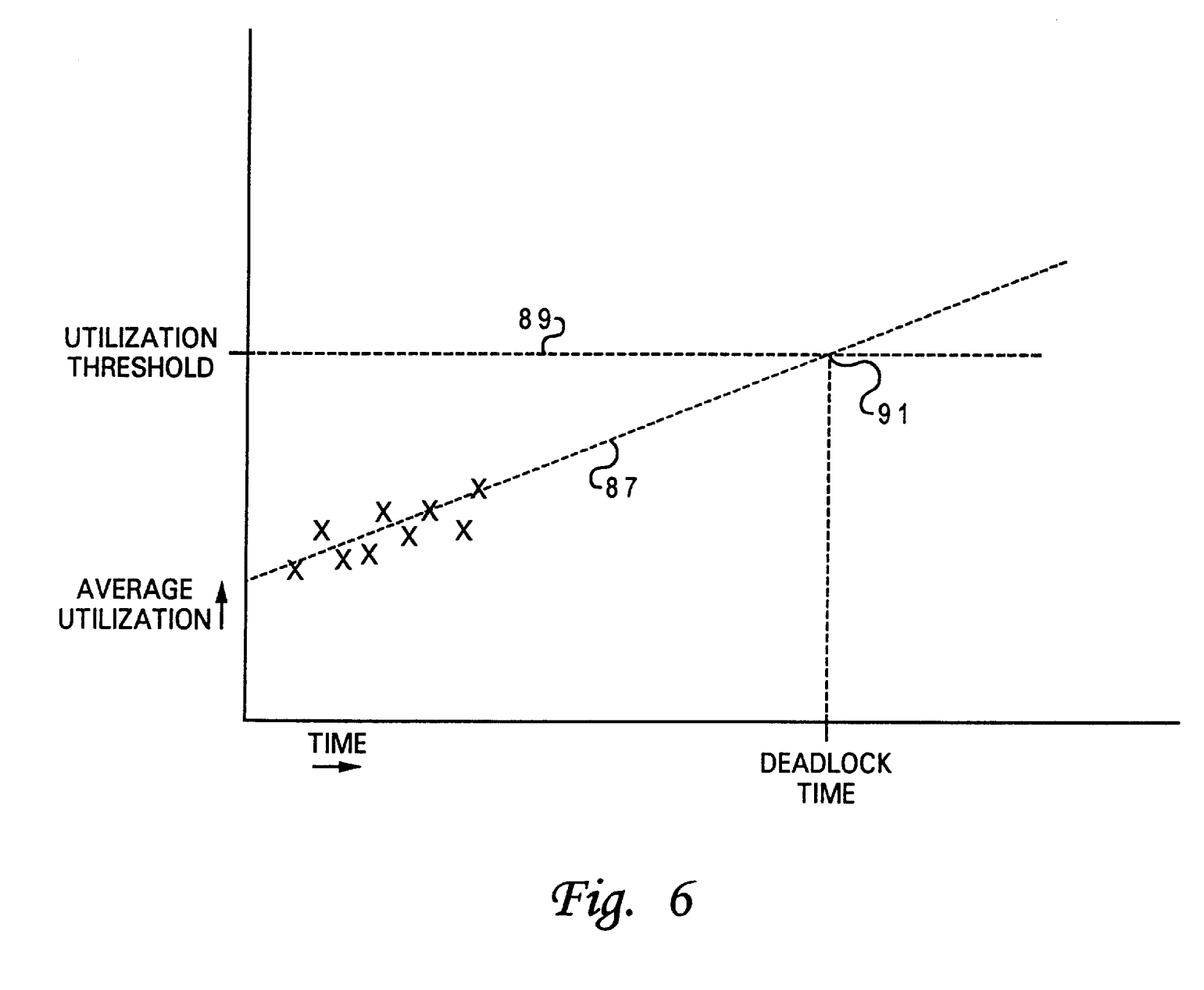
FIG. 6 is a pictorial illustration of the prediction method of the present invention.

Referring to FIG. 6, which shows a plot of average utilization versus time, running average utilization values are represented by Xs. A line 87 is fitted to the running average utilization values. The slope of line 87 is the rate of utilization increase. The utilization threshold is indicated by horizontal line 89. The point 91 where line 87 crosses threshold line 89 is the time at which a hardware resource deadlock will occur. Algebraically, deadlock time is equal to the threshold value minus the intercept value divided by the rate of utilization increase.

Referring again to FIG. 4, after the system has applied linear regression to the stored running average performance parameters, at block 85, the system compares the trends to the thresholds in the manner described with respect to FIG. 6, at block 93, and reports its results, at block 95.

From the foregoing, it may be seen that the method and system of the present invention monitor for hardware resource bottlenecks in real-time and provide recommendations for solving the observed bottlenecks. Additionally, the method and system of the present invention predict the occurrence of future bottlenecks so that corrective action may be taken before server performance becomes unacceptable. The method of the present invention is designed to execute as a background task on the server. Using the method of the present invention, the occurrence of a server hardware bottleneck can be projected to occur in time and can alert the system administrator so that the resulting performance bottleneck can be averted before it actually occurs.

What is claimed is:

1. A method of optimizing server performance, which comprises the computer implemented steps of:

monitoring at least one server hardware utilization parameter over a selected time period;

computing an average of said at least one server utilization parameter over said selected time period;

comparing said average to a threshold value for said at least one server utilization parameter;

reporting a performance bottleneck if said average is greater than said threshold value, wherein said reporting comprises sending an output to an output device of said server that is accessible to a system administrator;

recommending a solution to said performance bottleneck; and outputting a recommendation to the output device of said server.

2. The method as claimed in claim 1, wherein said utilization parameter is CPU utilization.

3. The method as claimed in claim 1, wherein said utilization parameter is memory utilization.

4. The method as claimed in claim 1, wherein said utilization parameter is disk utilization or disk queue depth.

5. The method as claimed in claim 1, wherein said utilization parameter is LAN byte throughput.

6. The method as claimed in claim 1, wherein said utilization parameter is LAN packet throughput.

7. The method as claimed in claim 1, including the computer implemented steps of:

monitoring said at least one utilization parameter over a plurality of selected time periods;

computing the average of said at least one utilization parameter for each selected time period;

determining a trend over time for said average;

predicting a performance bottleneck utilizing said trend; and outputting said prediction to said output device.

8. The method as claimed in claim 7, wherein said step of determining said trend includes the computer implemented step of applying linear regression to said average for each of said selected time period.

9. The method as claimed in claim 7, wherein said selected time periods are overlapping, whereby said averages are running averages.

10. The method of claim 1, wherein said server has a plurality of drives, said method further comprises:
   checking which one of said plurality of drives has a lowest running average utilization; and
   recommending that some of the work load be migrated to the drive with the lowest running average utilization.

11. A method of optimizing server performance, which comprises the computer implemented steps of:
   monitoring each of a plurality of server hardware utilization parameters over a selected time period;
   computing an average of each of said plurality of server utilization parameters over said selected time period;
   dynamically comparing each average to a threshold value for a corresponding utilization parameter;
   reporting a performance bottleneck if at least one of said average is greater than the threshold value for the corresponding utilization parameter, wherein said reporting comprises sending an output to an output device of said server that is accessible to a system administrator;
   recommending a solution to said performance bottleneck; and
   outputting a recommendation to the output device of said server.

12. The method as claimed in claim 11, wherein said utilization parameters are selected from a plurality of measurable utilization parameters including CPU utilization, memory utilization, disk queue depth, LAN byte throughput, and LAN packet throughput, said method including the computer implemented step of:
   applying a set of rules to said average values to report performance bottlenecks.

13. The method as claimed in claim 12, wherein said step of applying a set of rules includes the computer implemented step of:
   reporting a CPU bottleneck if:
      said average CPU utilization is equal to or greater than a CPU utilization threshold;
      said average memory utilization is less than a memory utilization threshold;
      said average disk queue depth is less than a disk queue depth threshold;
      said LAN byte throughput is less than a LAN byte throughput threshold; and,
      said LAN packet throughput is less than a LAN packet throughput threshold.

14. The method as claimed in claim 12, wherein said step of applying a set of rules includes the computer implemented step of:
   reporting a memory bottleneck if:
      said average CPU utilization is less than a CPU utilization threshold;
      said average memory utilization is equal to or greater than a memory utilization threshold;
      said average disk queue depth is less than a disk queue depth threshold;
      said LAN byte throughput is less than a LAN byte throughput threshold; and,
      said LAN packet throughput is less than a LAN packet throughput threshold.

15. The method as claimed in claim 12, wherein said step of applying a set of rules includes the computer implemented step of:
   reporting a disk bottleneck if:
      said average CPU utilization is less than a CPU utilization threshold;
      said average memory utilization is less than a memory utilization threshold;
      said average disk queue depth is equal to or greater than a disk queue depth threshold;
      said LAN byte throughput is less than a LAN byte throughput threshold; and,
      said LAN packet throughput is less than a LAN packet throughput threshold.

16. The method as claimed in claim 12, wherein said step of applying a set of rules includes the computer implemented step of:
   reporting a LAN bottleneck if:
      said average CPU utilization is less than a CPU utilization threshold;
      said average memory utilization is less than a memory utilization threshold;
      said average disk queue depth is less than a disk queue depth threshold; and,
      said LAN byte throughput is equal to or greater than a LAN byte throughput threshold or said LAN packet throughput is equal to or greater than a LAN packet throughput threshold.

17. The method as claimed in claim 12, wherein said step of applying a set of rules includes the computer implemented step of:
   reporting a system bottleneck if:
      said average CPU utilization is equal to or greater than a CPU utilization threshold;
      said average memory utilization is equal to or greater than a memory utilization threshold;
      said average disk queue depth is equal to or greater than a disk queue depth threshold;
      said LAN byte throughput is equal to or greater than a LAN byte throughput threshold; and,
      said LAN packet throughput is equal to or greater than a LAN packet throughput threshold.

18. The method of claim 11, wherein said server has a plurality of drives, said method further comprises:
   checking which one of said plurality of drives has a lowest running average utilization; and
   recommending that some of the work load be migrated to the drive with the lowest running average utilization.

19. A data processing system comprising:
   a processor; and
   a program code executed on said processor for predicting a hardware performance bottleneck, said program code including code for:
   monitoring a hardware utilization parameters over selected time periods;
   computing running averages of said hardware utilization parameter over said selected time periods;
   determining a trend in said running averages;
   predicting a bottleneck by comparing said trend to a threshold value for said hardware utilization parameter; and
   outputting a prediction of said bottleneck to an output device.

20. The data processing system as claimed in claim 19, wherein said program code for determining said trend includes the step of applying linear regression to said running averages.

21. The data processing system as claimed in claim 19, wherein said program code for outputting said prediction includes code for outputting a recommendation to preempt said bottleneck.

22. The data processing system as claimed in claim 21, wherein:

said data processing system is a server within a LAN network; and said utilization parameter is further selected from among LAN byte throughput and LAN packet throughput.

23. The data processing system as claimed in claim 19, further comprising:

a memory;

a disk having a queue dept; and wherein said utilization parameter is selected from among average processor utilization, average memory utilization, and average disk queue depth.

* * * * *